Nov. 13, 1962  B. F. THOMAS ETAL  3,064,117
APPARATUS AND METHOD FOR PRODUCING HONEYCOMB CORE MATERIAL
Filed June 16, 1959  6 Sheets-Sheet 1

INVENTORS.
BOYD F. THOMAS
JAMES C. THOMAS, III
BY
ATTORNEY.

Nov. 13, 1962 B. F. THOMAS ETAL 3,064,117
APPARATUS AND METHOD FOR PRODUCING HONEYCOMB CORE MATERIAL
Filed June 16, 1959 6 Sheets-Sheet 3

INVENTORS.
BOYD F. THOMAS
JAMES C. THOMAS, III
BY

ATTORNEY.

Nov. 13, 1962 B. F. THOMAS ETAL 3,064,117
APPARATUS AND METHOD FOR PRODUCING HONEYCOMB CORE MATERIAL
Filed June 16, 1959 6 Sheets-Sheet 4

FIG. 4

INVENTORS.
BOYD F. THOMAS
JAMES C. THOMAS, III
BY
ATTORNEY.

Nov. 13, 1962  B. F. THOMAS ETAL  3,064,117
APPARATUS AND METHOD FOR PRODUCING HONEYCOMB CORE MATERIAL
Filed June 16, 1959  6 Sheets-Sheet 6

INVENTORS.
BOYD F. THOMAS
JAMES C. THOMAS, III
BY
ATTORNEY

United States Patent Office

3,064,117
Patented Nov. 13, 1962

3,064,117
APPARATUS AND METHOD FOR PRODUCING
HONEYCOMB CORE MATERIAL
Boyd F. Thomas and James C. Thomas III, Pasadena,
Calif., assignors to Young Spring & Wire Corporation,
Detroit, Mich., a corporation of Michigan
Filed June 16, 1959, Ser. No. 820,765
25 Claims. (Cl. 219—82)

This invention relates to the fabrication of honeycomb core structures and more particularly to an improved method and apparatus for automatically fabricating metal foil stripping by electric welding making use of co-ordinated welding and indexing mechanism in which such core and corrugated stripping are indexed into welding position and held stationary there while welding electrodes are passed astride abutting crests to weld the same together following which the electrodes are retracted as further increments of material are indexed into welding position.

The characteristics and advantages of honeycomb core material particularly for use in the construction of lightweight, high-strength structural assemblies has long been recognized and many proposals have been made having as their objective the rapid and economical fabrication of such cores. It has long been recognized that maximum strength for a given weight of material is achieved when the core is formed of foil-like metal stripping corrugated transversely of its width and intimately bonded together lengthwise of abutting crests following which the resulting core material is intimately bonded between metal face sheets to form a sealed sandwich. However, the rapid and economical fabrication of such core material to the requisite exacting tolerances and specifications has presented serious problems not satisfactorily solved heretofore. Formerly the control of the welding current with the required precision involved when welding foil-like metal stripping presented insurmountable problems, but these have now been solved quite satisfactorily by commercially available equipment capable of controlling the duration and magnitude of the welding current.

However, there have remained other problems of a very vexacious and frustrating nature. For example, the strength of sandwich structures having cellular cores is dependent to a high degree on the presence of an intimate and continuous high-strength junction between the core faces and the abutting surfaces of the metal face sheets. In the absence of such a continuous bond the cell walls lack vital connection and support with the result that the sandwich fails upon the application of a fraction of its potential load strength. Such continuous joints are possible only when all portions of the cell ends lie in a common plane.

Prior attempts to fabricate core material with the cell ends lying in a common plane have failen so far short of practical accomplishment that it has been necessary to resort to very costly and time-consuming techniques for dressing the cell ends to remove gross and unavoidable irregularities. Owing to the low tear strength of the foil material comprising the cells, ordinary dressing techniques are unsuitable. Thus the end surfaces of the core cannot be dressed by grinding, honing, milling or planing unless the cell walls are fully supported in some manner. To this end, it has been the practice heretofore to fill the core with hot wax. After the wax has taken a set, the core may be submitted to one of several appropriate dressing techniques performed carefully and slowly until thorough inspection shows the cell ends lie in a common plane. Thereafter, the wax is melted away and the core is subjected to thorough degreasing and dewaxing to remove all traces of the wax as a prerequisite to the brazing of the core to face sheets. Another dressing technique sometimes followed involves filling the core with water and maintaining the water frozen while dressing the core ends. Although this method has the advantage of avoiding the troublesome degreasing operation required when employing wax, it requires heavy-duty and costly refrigeration equipment.

Despite continuing efforts by many designers to develop welding equipment capable of precisely aligning the foil edges prior to welding, no satisfactory method or apparatus for doing so to the required tolerances has been provided prior to the present invention.

Another troublesome problem involved in the manufacture of welded cellular cores deals with the related problem of advancing the components into welding position with the desired accuracy and reliability. Various indexing and holding mechanisms have been developed, but these are subject to disadvantages and shortcomings avoided by the present invention. For example, in this invention the welding electrode assembly is operatively correlated with the indexing mechanism with the result that the welding and indexing steps are performed in a desired time-phase relationship. The indexing mechanism comprises a pair of nested plates movable parallel to one another through short reciprocatory paths at right angles to each other thereby to move a set of indexing pins through a rectangular path to advance successive increments of the strip and of the core into welding position. Immediately following this operation, a common continuously-rotating driving mechanism reciprocates the welding electrodes transversely of the cellular core while simultaneously retracting the indexing pins to initiate a new indexing sequence. Prior to the full withdrawal of the indexing pins from the core, holding pins operatively associated with the welding electrodes are introduced into core cells to lock the core firmly in position at the welding station. Concurrently with the final advancement of the holding pins into position, a pair of clutching plates engage the opposite faces of the core under a predetermined resilient load in a manner to bring the edges of stripping to be welded precisely into co-planar relation with the faces of fabricated core. Immediately following this aligning and clamping operation, a roller electrode is passed under pressure against the parts to be welded. Another feature of the invention is the support of both the electrode and indexing assemblies to one side and preferably below the core supporting table top thereby leaving the table top freely accessible from the top.

According to a preferred mode of practicing the invention, flat metal stripping accurately cut to uniform width is fed from a supply roll through equipment to corrugate the strip transversely thereof. This stripping is spirally looped edgewise to form a loop of 20 to 30 feet or more in circumference, the successive edgewise convolutions being so positioned that oppositely facing crests are brought into juxtaposition at the welding station and in alignment with the paths of reciprocation of both the indexing pins and the welding electrodes. The driving motor is effective to index the loop past the welding station to bring a new pair of abutting crests into welding position during each indexing cycle. In this manner the stripping continues to be indexed past the welding station to build a loop of core of any desired width without attention by an operator other than the provision of general surveillance over the operation.

The predetermined pressure applied by the clamping plate to the opposite faces of the components about to be welded not only serves to shift the corrugated strip into proper position, but actually applies any force necessary to correct irregularities or misalignments of the strip edges with the rim edges of adjacent cells of the fabricated core.

In this manner, assurance is provided that all cell edges forming the faces of the core product will lie precisely in parallel co-planar relation to a tolerance variation of less than 0.0005 inch and never exceeding 0.001 inch. By virtue of these easily attained tolerances characteristic of the core product produced by the welding apparatus of this invention, the heretofore universally performed dressing operations are rendered totally unnecessary and the produced core product is passed directly to a degreasing operation, if such be necessary, following which the core is sandwiched, along with films of brazing compound, between metal face sheets and brazed together under pressure in a furnace by known technique. Not only is the resulting sandwich product of superior strength and uniformity, but lighter in weight owing to the feasibility of employing thinner films of brazing compound than is feasible with cores fabricated in any other manner, all without sacrifice of strength in any degree.

Accordingly, it is a primary object of the present invention to provide an all metal honeycomb core sandwich structure of lighter weight, yet higher strength, as well as a superior method of making the same.

Another object of the invention is the provision of an improved automatic welding apparatus for fabricating metal honeycomb core structures.

Another object of the invention is the provision of an improved method of fabricating corrugated metal stripping into honeycomb core structures with the cell edges lying precisely in co-planar relationship.

Another object of the invention is the provision of compact, simple, positively-coordinated commonly-driven welding electrode and material indexing mechanism wherein the components cooperate to weld the abutting crests of corrugated metal stripping together with precision and without assistance from a human operator.

Another object of the invention is the provision of automatic welding apparatus for fabricating honeycomb structure characterized by the provision of automatic means for clamping the opposite edges of corrugated strip into co-planar relation with the faces of fabricated core structure and for holding the edges firmly so coordinated while welding engaged surfaces of the honeycomb structure and of the strip together.

Another object of the invention is the provision of electric welding apparatus having new and simplified indexing mechanism for feeding components of material by increments accurately into position for welding at a welding station.

Another object of the invention is the provision of an improved welding assembly having a pair of electrodes arranged to be sequentially moved into welding position and featuring means for applying welding pressure and current after the electrodes have been placed astride the parts to be welded.

Another object of the invention is the provision of a compact integrated welding electrode and material indexing mechanism having intimately associated components operated at variable rates directly from a common shaft rotating at a constant speed.

Another object of the invention is the provision of integrated material indexing and electrode feeding mechanism driven at variable rates in different portions of each cycle by power derived from a shaft rotating at uniform speed.

Another object of the invention is the provision of an indexing mechanism for use with an automatic welder for core material comprising a pair of parallel plates mounted for co-planar movement in reciprocal paths extending at right angles to one another to move indexing pins supported by one of the plates through a rectangular path by cam means rotating generally in a plane of the plates and engageable sequentially with diametrically spaced cam-contacting surfaces carried by said plates.

These and other more specific objects will appear upon reading the following specification and claims and upon considering in connection therewith the attached drawings to which they relate.

Referring now to the drawings in which preferred embodiments of the invention are illustrated.

Referring to the drawings and more particularly to FIGURES 1 to 4, there is shown one preferred embodiment of a welding apparatus for practicing the invention designated generally 10 having a main frame including a broad area base 11, an upright support pedestal 12 and a broad area flat table 13 across which a loop of honeycomb core material 14 is adapted to be indexed while being fabricated. Core 14, as here shown by way of example, comprises a generally elliptical-shaped loop of appropriate girth, as 25 feet, supported in part by table top 13 and, in part by a plurality of broad surfaced rollers supported by suitable frame work 16 secured to pedestal 12 and additionally by other rollers 15 mounted on base 11.

Suitable electronic timing and welding current control equipment of known commercial type is housed in a compartment 18 mounted on base 11 and is connected in known manner to a commercial power supply source. The unitary electrode assembly and indexing mechanism, together with the single driving motor therefor, will be referred to briefly before leaving FIGURE 1 to convey a general concept of the relationship of these components with respect to pedestal 12 and to the overlying table top 13. These components include a main motor M supported from pedestal 12 through a mounting bracket 19 and connected to drive a 5 to 1 speed reduction device 20 having its output shaft suitably connected by means to be described presently to the material feeding or indexing mechanism 21.

Figure 1:
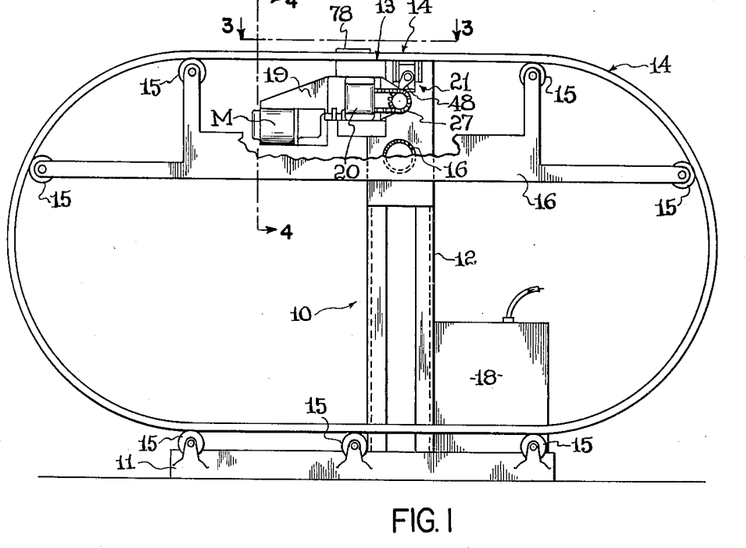
FIGURE 1 is a rear side elevational view of one preferred embodiment of a welding apparatus incorporating the present invention.
Figure 2:
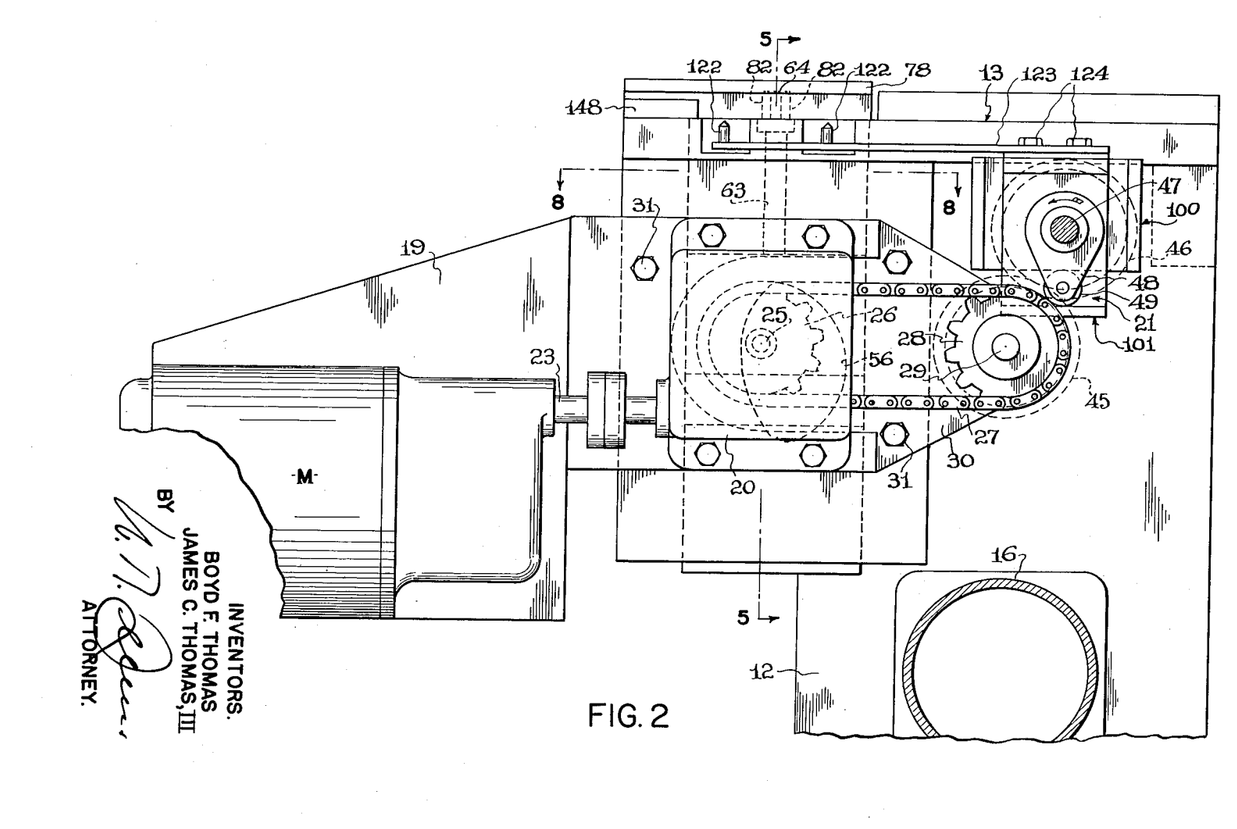
FIGURE 2 is a similar view on an enlarged scale of the central upper portion of FIGURE 1 featuring the integrated welding electrode and indexing mechanisms, the welding electrodes being in welding position and the indexing pins being withdrawn from the core.
Figure 4:
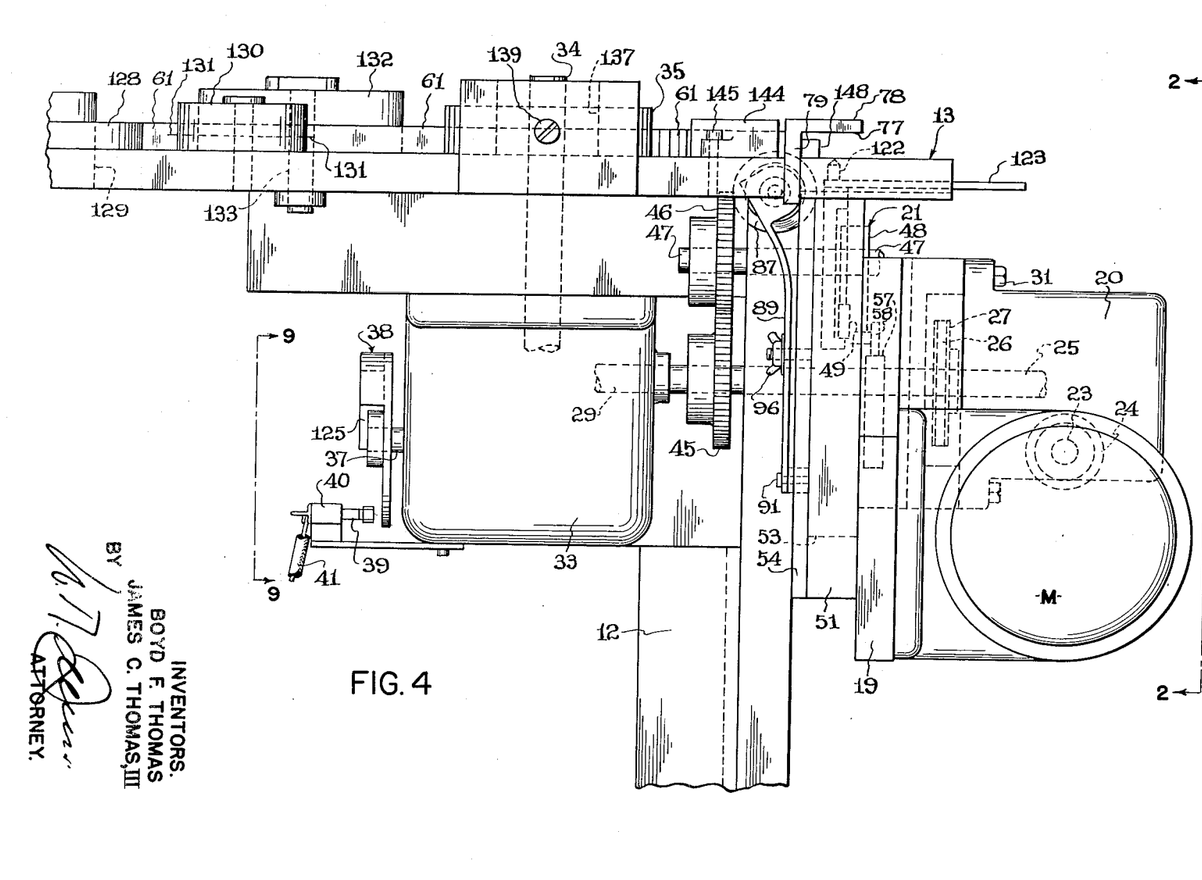
FIGURE 4 is a cross-sectional view on an enlarged scale of components of the welding station and of the corrugating mechanism taken on line 4—4 of FIGURE 1.
Figure 5:
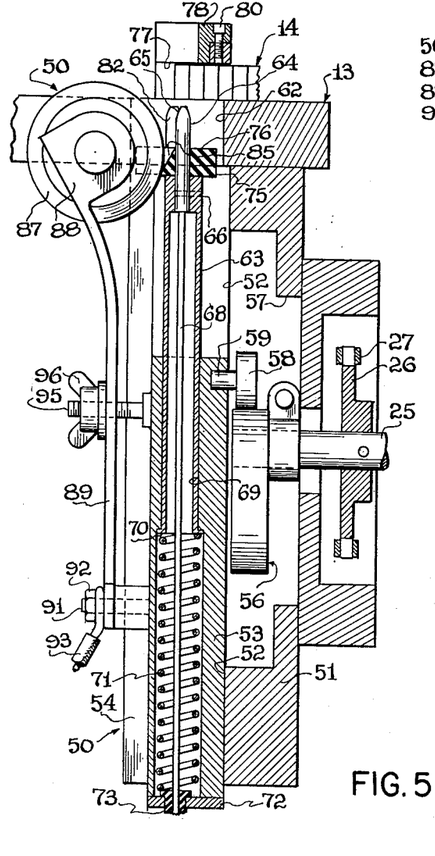
FIGURE 5 is a longitudinal sectional view on an enlarged scale taken along line 5—5 on FIGURES 2 and 3 to show details of the electrode assembly, the electrodes then being fully retracted.
Figure 6:
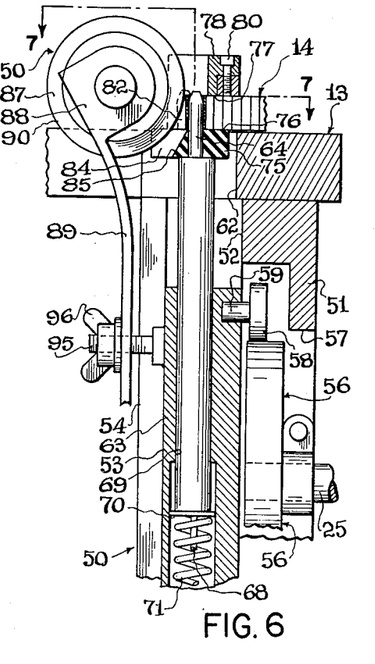
FIGURE 6 is a fragmentary view similar to FIGURE 5 but showing the positions of the parts at the upper end of the welding stroke.

Referring now particularly to FIGURES 2 and 4, it is pointed out that motor shaft 23 drives a worm 24 of speed reduction device 20 in mesh with other gearing driving the low speed output shaft 25 journaled in suitable bearings and having fixed thereto a sprocket wheel 26 driving a roller chain 27 meshing with an identical sprocket 28. The latter sprocket is fixed to a shaft 29 supported on an extension 30 of bracket 19 secured to column 12, as by cap screws 31. The left end of shaft 29 as viewed in FIGURE 4 drives a 30 to 1 gear reduction 33 rigidly secured to the underside of table top 13 in any suitable manner. Output shafts from speed reduction gearing 33 include a slow speed vertical shaft 34 driving a pair of loosely intermeshing corrugating gears 35, 35 supported against the upper surface of table top 13 and relatively slow speed shaft 37. Shaft 37 operates at the same speed as shafts 25 and 29 to drive a switch operating cam sector 38, a switch arm 39 of switch 40, the latter being connected through lead wires 41 to the electronic control mechanism for the welding electrodes.

The drive for indexing mechanism 21 comprises a spur gear 45 fixed to shaft 29 and meshing with an identical spur gear 46 fixed to a shaft 47 journaled in column 12. Fixed to the right end of shaft 47 (FIGURE 4) is a crank arm 48 supporting a roller 49 engageable with the flanged ends of the indexing mechanism 21 in a manner to be described presently.

The Welding Electrode Assembly

Referring now more particularly to FIGURES 3, and 5 to 8, the welding electrode assembly, designated generally 50, will be described. This assembly includes a main mounting frame 51 rigidly secured to supporting pedestal 12 and to the underside of table top 13 in any suitable manner. Mounting frame 51 is provided with a vertical slot or slideway 52 slidably supporting an electrode carrier 53 held accurately assembled within the slideway by closure strips 54, 54 and cap screws 55.

Electrode carrier 53 is reciprocated through a complete cycle along slideway 52 at a variable rate during each revolution of shaft 25. Reciprocation is produced by a cam 56 fixed to shaft 25 and positioned within an appropriately contoured opening 57 of the electrode supporting frame 51. Riding on the surface of driving cam 56 is a cam follower roller 58 mounted on a pin 59 fixed to the face of electrode carrier 53.

Figures 3, 9:
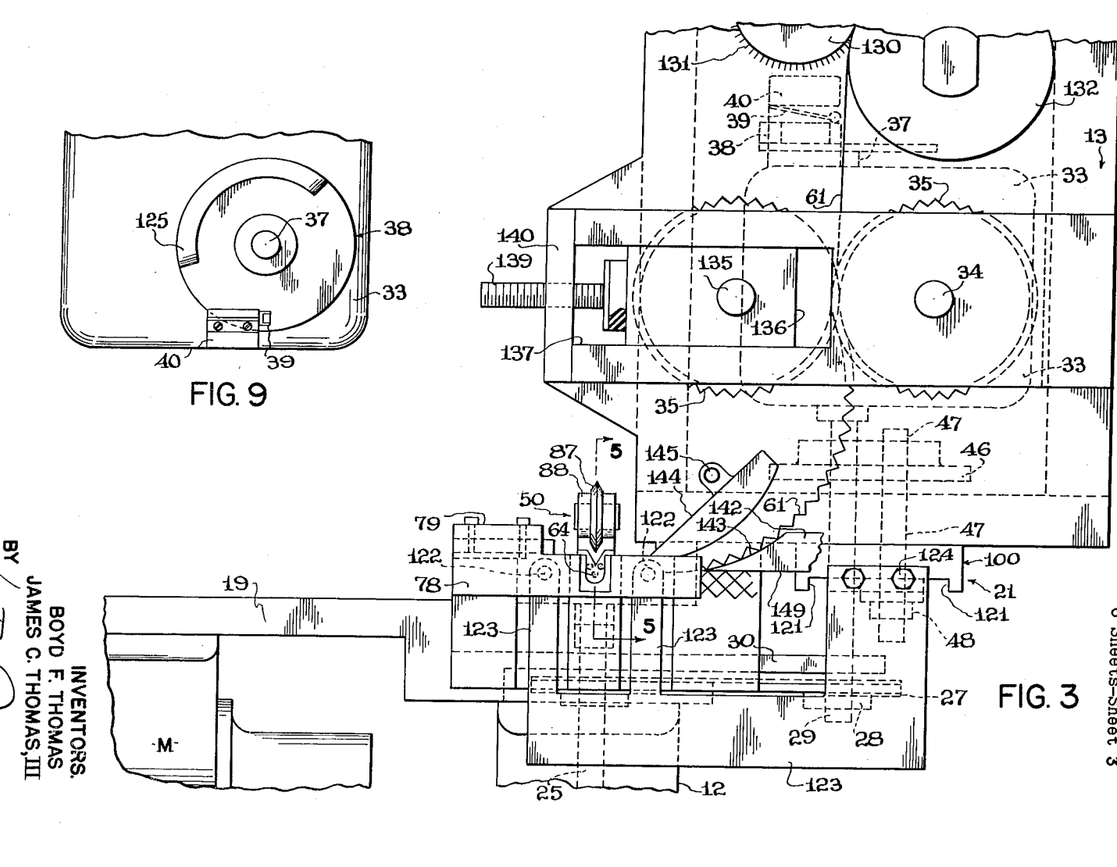
FIGURE 3 is a fragmentary top plan view on an enlarged scale showing the corrugating mechanism discharging corrugated stripping to the welding station, the view being taken along line 3—3 on FIGURE 1.
FIGURE 9 is a fragmentary elevational view taken along line 9—9 on FIGURE 4 and showing the switch and control mechanism for the welding power supply.

The upper end of slideway 52 is in vertical alignment with a notch 62 formed in the edge of table top 13 and it is over this opening that the corrugated strip 61 and the honeycomb core material 14 is indexed for fabrication by welding electrode assembly 50. Assembly 50 includes a hollow plunger 63 slidably mounted in electrode carrier 53 and having fixed to its upper end a rigid upright finger-like copper electrode 64 provided with an upright narrow edge 65 adapted to be pressed against the interior of a core cell crest during the welding operation of this crest to the abutting crest of corrugated strip 61 (FIGURE 3). Electrode 64 is held assembled to the end of plunger 63 by a pin 66 and has a welding current conductor 68 extending through the plunger and the enlarged lower end of a shouldered bore 69 extending vertically through electrode carrier 53. The lower end of plunger 63 has an outturned flange 70 normally held pressed against the shoulder of bore 69 by a stiff coil spring 71. A cap 72 at the lower end of bore 69 holds the spring assembled within the bore and seats an insulation bushing 73 through which conductor 68 extends.

An important feature of the welding station defined in part by electrode assembly 50 is the provision of a pair of mutually cooperating clutch plates for bringing the edges of corrugated strip 61 into precise co-planar relation with the faces of core 14 and for clamping them in this position for welding. To this end the upper end of plunger 63 has rigidly secured thereto a plate of insulation material 75 having an accurately finished flat top surface 76 engageable with the lower surface of core 14. Surface 76 lies accurately parallel to the similarly finished flat surface 77 of a stationary clamping plate 78 closely overlying the top surface of core material 14 at a point above electrode opening 62 in table top 13.

As best appears from FIGURE 4, stationary clutch plate 78 is of L-shape and has its vertical leg 79 secured to the edge of table top 13 by cap screws not shown. Horizontal leg 78 of the stationary clamping plate is detachably secured to vertical leg 79 by cap screws 80. Desirably, vertical leg 79 of the clamping plate assembly is adjustable vertically until the vertical height between the top surface of table 13 and flat surface 77 is slightly greater than the thickness of core structure being fabricated. Normally, a clearance of 5 to 10 mils is satisfactory and permits the core to be indexed freely across the table top without interference from stop surface 77. However, it will be recognized that the optimum clearance distance varies under different operating conditions.

Figure 7:
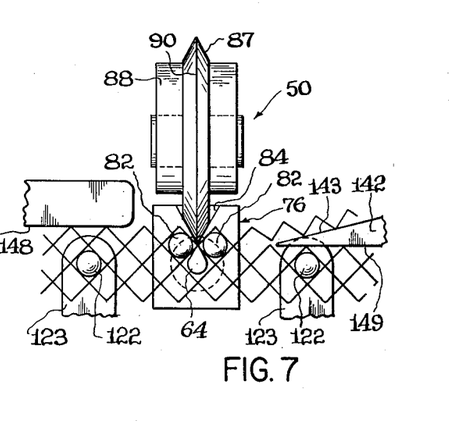
FIGURE 7 is a fragmentary top plan view taken along broken line 7—7 on FIGURE 6, certain components being shown removed for clarity.
Figure 8:
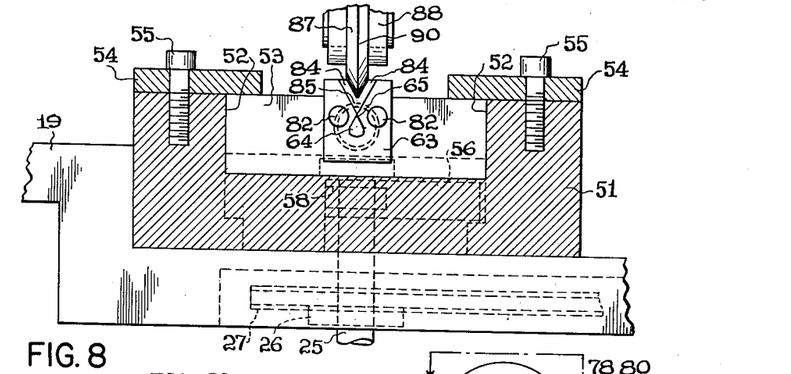
FIGURE 8 is a fragmentary horizontal sectional view on an enlarged scale taken along a broken line indicated generally at 8—8 on FIGURE 2.

Referring back to base plate 75 secured about the lower end of finger electrode 64, it is pointed out that this plate supports a pair of identical holding fingers 82, 82 extending vertically to either side of electrode 64 in the positions made clear by FIGURES 7 and 8. Holding pins 82, 82 have pointed upper ends functioning to guide the pins into aligned cells of the core structure, the main body of pins 82 fitting these cells with a close sliding fit so as to hold the core accurately in position for the welding operation.

A feature of base plate 75 is the provision of V-shaped notch 84 (FIGURES 6 and 8) having an inclined trackway 85 at its apex terminating at its junction with narrow edge 65 of finger-like electrode 64. A copper roller electrode 87 rotatably supported in the bifurcated upper end 88 of a stiff spring leaf support, and conductor 89 rides along trackway 85 and crosswise of the corrugated strip 61 to weld the strip to the exposed crests along one lateral edge of core 14. Owing to the described arrangement of roller 87 and trackway 85 the roller does not damage the edge of the strip as it passes thereover despite the pressure acting on the roller from the spring supporting arm 89. As is made clear by the drawings, roller electrode 87 has a narrow beveled edge 90 aligned with and directly opposite the cooperating narrow edge 65 of finger electrode 64.

The supporting spring arm 89 for roller electrode 87 has its lower end rigidly secured to electrode carrier 53 as by a threaded post 91 and a lock nut 92. This nut also serves to connect welding current conductor 93 to arm 89. Provision for adjusting welding pressure applied to the strip and core during welding includes a threaded post 95 rigidly secured to carrier 53 and passing through an enlarged opening in supporting arm 89. Adjustment of a wing nut 96 threaded over post 95 acts in an obvious manner to vary the welding pressure applied to the parts being welded. In the position of the parts shown in FIGURE 5, the electrode assembly is in its fully retracted position and the edge of roller 87 is held pressed against the lower portion of trackway 85 in insulation base plate 75. The finger electrode 64 and carrier 53 are likewise fully retracted, it being noted that flange 70 of finger-supporting plunger 63 is held seated against the shoulder midway of bore 69. In the position of the parts shown in FIGURE 6, the electrode assembly is fully elevated and the axis of roller electrode 87 lies slightly above the upper edge of the strip being welded to core 14. It is emphasized that throughout the period of travel of roller 87 across core 14, stiff spring 71 is effective to urge plunger 63 upwardly holding flat surface 76 of the lower clutch plate 75 firmly against the lower face of core 14 thereby holding the latter, as well as strip 61, firmly against surface 77 of upper clutch plate 78. It will be recognized that, in this position, clutch plate 75 cooperates with the stationary upper plate 78 to hold the corrugated strip as well as the adjacent portion of core 14 firmly clamped between the flat surfaces 76 and 77 of the clamping members, a condition that obtains just prior to and throughout the excursion of welding roller 87 crosswise of the corrugated strip. During this clamping period, it will be understood that the lower surface of core 14 in the area adjacent surface 76 of clutch plate 75 is separated from supporting table 13 by a distance of 5 to 10 mils, this clearance being found quite satisfactory in the use of the welding machine.

*Index Mechanism*

Figure 10:
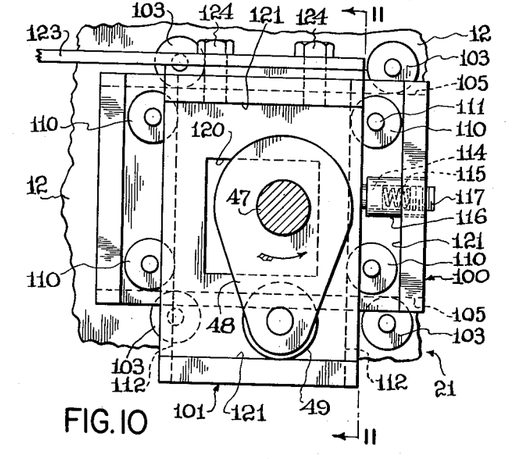
FIGURE 10 is a fragmentary side elevational view of the indexing mechanism taken from the upper right hand corner of FIGURE 2.
Figure 11:
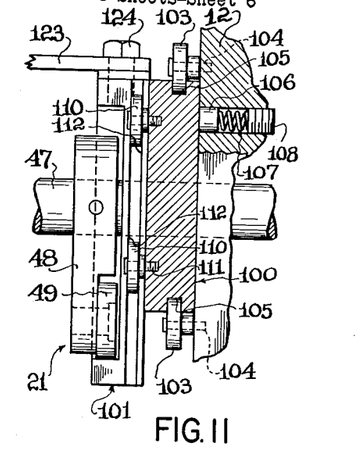
FIGURE 11 is a cross-sectional view taken along line 11—11 on FIGURE 10.

Referring now more particularly to FIGURES 2, and 10 to 15 dealing with the indexing mechanism, it is pointed out that this mechanism includes a pair of channel-shaped generally rectangular plates 100 and 101 having their web portions in sliding engagement with their similarly projecting flanges arranged at right angles to one another. Plate 100 is accurately supported for to-and-fro movement in a horizontal direction by two pairs of rollers 103 mounted on axle pins 104 fixed to the vertical face of the machine frame. As is best shown in FIGURE 11, the rims of rollers 103 operate in grooves 105 extending along the upper and lower edges of plate 100. Plate 100 is held against movement other than that imparted by the indexing drive by frictional engagement with the end of clutch plunger 106 (FIGURE 11) urged against the back face of the plate by a compression spring 107, this spring being held seated in a threaded bore by a set screw 108.

Plate 101 of the indexing mechanism is generally similar to plate 100 and is supported for limited movement in a vertical path crosswise of plate 100 by two pairs of rollers 110 mounted on threaded axle pins 111 supported by the web of plate 100. The opposite vertical edges of the web of plate 101 are provided with grooves 112 seating the rims of rollers 110. Unintended movement of plate 101 is prevented by a friction clutch corresponding to that described for plate 100. Thus, a plunger 114 is urged against the right hand edge of plate 101 by a compression spring 115 held in a threaded bore of a tubular nipple 116 by a set screw 117. Nipple 116 is mounted in a bore transversely of a flange at the end of plate 100 and is so positioned as not to interfere with driving crank 48 employed to reciprocate indexing plates 100, 101. Accordingly, friction clutch or plunger 114 preferably is shaped to seat in groove 112 to provide greater frictional contact with plate 101.

From the foregoing it will be apparent that plate 100 is reciprocable horizontally across a vertical face of the welder main frame while supported by rollers 103 operating in grooves 105, whereas plate 101 is reciprocable vertically against the web of plate 100 on rollers 110 seated in grooves 112 along the opposite vertical faces of plate 101. Unintended movement of plates 100 and 101 relative to each other and to the welder frame is prevented by the described friction clutches 106, 114.

The center portions of the webs of both plates 100 and 101 are cut away as indicated at 120 to provide ample room for the to-and-fro reciprocal movement of the plates without interference from shaft 47 and driving crank 48 fixed to this shaft. The similarly directed end flanges of each indexing plate include accurately finished interior faces 121 along which roller 49 carried by crank 48 rolls to shift first one of the plates and then the other to one extreme of its to-and-fro path of movement. This movement is employed to move the indexing pins, now to be described, through a rectangular path to index the core material past the welding station.

Figures 12, 13:
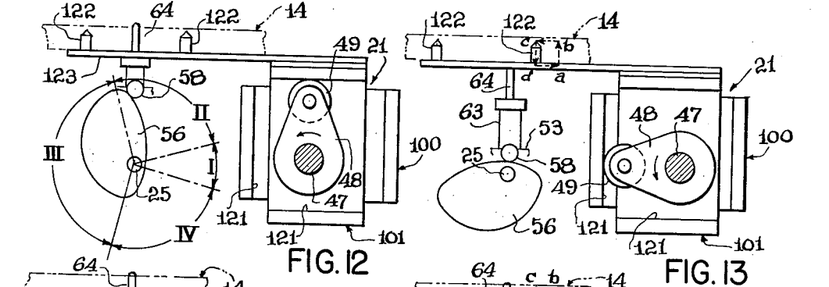
FIGURES 12, 13, 14 and 15 are fragmentary diagrammatic views showing the indexing mechanism and the associated electrode assembly in four successive 90 degree positions of a single cycle of operation.

The upwardly directed indexing pins 122 having pointed upper ends are rigidly secured at their lower ends in one pair of legs of an E-shaped supporting plate 123, the other and wider leg of plate 123 being rigidly secured to the upper end of indexing plate 102, as by cap screws 124 (FIGURES 3, 10 and 11). Indexing pins 122 are preferably spaced to either side of welder assembly 50 and are movable in unison through a rectangular path indicated by the dotted line arrows *a*, *b*, *c*, and *d* in FIGURES 13 and 15. The arrow tips represent the successive points of the tips of the indexing pins. For example, arrow "*a*" indicates the position of the right hand pin 122 at the end of the rearward retraction movement prior to elevation of the pin into an overlying cell of core 14, crank 48 then being in the position shown in FIGURE 15. Arrow "*b*" corresponds to the position of pin 122 when fully elevated into the core material as it is when crank 48 occupies the position shown in FIGURE 12. Arrow "*c*" shows the position of pin 122 at the end of the forward indexing stroke at which time crank 48 occupies the position shown in FIGURE 13. Arrow "*d*" represents the position of pin 122 at the end of the downward withdrawal movement reached when crank 48 is in the position shown in FIGURE 14. The corresponding positions of the finger-like electrode 64, of the welding assembly of carrier 53, and of cam 56 are also illustrated in FIGURES 12 and 13, it being pointed out that the arrow on electrode supporting plunger 63 of each figure indicates the direction of movement of the electrode finger associated with the next 90 degree movement of crank 48. For example, while the pins are moving upwardly into the core from "*a*" to "*b*," carrier 53 and electrode supporting plunger 63 are moving downwardly rapidly into a retracted position clear of core 14 in readiness for the next forward indexing movement of the core. As will be best understood from FIGURE 12 showing the positions of the parts at the initiation of the forward indexing stroke, cam 56 is so designed as to effect the complete downward withdrawal of the electrodes before roller 49 on arm 48 can engage the left hand surface 121 of plate 100 to advance the core.

In connection with the proper spacing as well as the coordinated movement of the indexing pins and of the holding and welding electrodes, it is pointed out that the electrodes are movable through a vertical path appreciably greater than the thickness of the core being welded. Over-travel of the electrodes is reduced to a minimum with a consequent increase in the efficiency of the welder by the proper design of cam 56 and the coordinated design of crank 48 of the indexing mechanism relative to surfaces 121 of plates 100 and 101. In other words, different portions of the periphery of cam 56 are contoured for fast, slow or intermediate speed travel of the electrodes and roller 49 is so arranged relative to surfaces 121 that the indexing plates and associated indexing pins 122 move quickly following intervening periods of dwell. Such dwell periods enable the welding electrodes to make certain portions of their excursions without interference with the indexing of the core or with the continuous and uniform rotation of the driving mechanism.

Referring now to FIGURE 12, a description will be given of the four principal zones of the electrode driving cam 56 and of its corresponding rim portions. The four zones are designated I, II, III and IV, respectively, zone I having the shortest radius and an arc length of 30 degrees. Zones II and IV to either side of zone I each occupy 90 degrees, while zone III extends through 150 degrees. The radius of the cam rim between zones III and IV is sufficient to fully elevate electrode finger 64 as well as clamping plate 76 sufficiently high to clamp the core and strip 61 against upper stationary plate 78. The radius of the cam at the merger of zones II and III is sufficient to extend both the finger and the roller electrode to their maximum excursion positions, and the relatively long cam face of zone II is contoured to allow the electrode assembly to retract rapidly to its lowermost position prior to the time crank 48 is positioned to index core 14 forwardly to the next welding position. The cam periphery along zone IV is contoured to elevate finger electrode 64 at a relatively fast rate compared to the movement of the roller electrode, the speed of the latter being governed by the contour of the cam edge in zone III. It is important that the welding operation be carried out while roller electrode 87 is moving steadily and slowly. For this reason, the area of zone III is so contoured that during the time the welding current is on, the roller advances slowly and at a uniform rate for each degree of rotation of cam driving shaft 47.

At this time it is thought well to comment on the nature and duration of the dwell periods between movements of indexing plates 100 and 101. For example, when crank 48 is in its vertical or twelve o'clock position illustrated in FIGURE 12, both indexing plates and pins 122 remain stationary until roller 49 has rotated counterclockwise to contact surface 121 on the flange at the left end of index plate 100. The point of contact of roller 49 with this flange will be approximately in the ten-thirty o'clock position. From this point until crank 48 has rotated to the horizontal or nine o'clock position shown in FIGURE 13, indexing pins 122 will be moving forwardly to the tip of arrow "c" where they will remain without movement until crank 48 has rotated counterclockwise to approximately the seven-thirty o'clock position, at which time it will strike surface 121 of the flange at the lower end of the indexing plate 101. During the movement of crank 48 from the seven-thirty to the six o'clock position, indexing pins 122 are being retracted downward. A similar explanation follows for the remaining portion of the indexing cycle, it being understood that movement of the indexing plates and pins occurs alternately between equal length periods of dwell.

Referring now more particularly to FIGURES 4 and 9, an explanation will be given of the manner in which the period of welding current flow is coordinated with the excursion of the welding electrodes across a pair of abutting crests of the material being welded. Referring first to FIGURE 4, it is pointed out that speed reducer 33 includes a shaft 37 rotating at the same speed as the electrode driving shaft 25 and supports a cam disc 38. An elevational face view of this cam disc is shown in FIGURE 9 and includes a raised rim 125 approximately 150 degrees in extent. Raised rim 125 rotates past switch operating arm 39 of switch 40 and is effective to close the switch energizing the electronic control mechanism during that interval of the welding electrode excursion when welding roller 87 is in pressure contact with strip 61 of metal foil to hold the latter clamped and the intervening strip of core 14 against edge 65 of the finger electrode 64.

Referring now to FIGURE 3 and looking downwardly onto table top 13 of the welder apparatus, it is pointed out that a flat strip 61 of the foil to be corrugated and welded to form the core 14 is fed from a supply spool 128 (FIGURE 4) mounted over a spindle 129 carried by the upper side of table 13. If it is desired that strip 61 be provided with small perforations, as is preferable when employing certain bonding agents to bond the finished core between face sheets, strip 61 is fed past a wheel 130 provided with appropriately spaced short steel pins 131 cooperating with a rubber back-up disc 132 mounted on a supporting pin 133.

The perforated flat strip 61 discharging from this device then passes between a pair of similar corrugating rolls 35, 35, one of which is mounted on a vertical shaft 34 driven by speed reduction gearing 33. The other roll 35 is supported on a stub shaft 135 fixed in a supporting block 136 slidable along a grooved slideway 137. It will be understood that the corrugating rolls 35 are adapted to be adjusted as required for the precision transverse corrugating of strip 61 by a screw 139 mounted in a supporting cross-piece 140 at one end of slideway 137.

The corrugated strip 61 issuing from rolls 35, 35 is guided into abutting relation with the adjacent lateral edge of core 14 by a guide strip 142 fixed to the top of table 13 and having an arcuate guide surface 143 terminating in a point closely adjacent the area in which the crests of strip 61 mate with the juxtaposed crests of the outer layer of core 14. Cooperating with guide surface 143 is an adjustable arcuate guard member 144 adjustably mounted on table top 13 by means of a pivot pin 145.

A major portion of table top 13 is omitted from FIGURE 3 in order to show details of the underlying material indexing mechanism and the electrode assembly. However, it will be understood that the table top extends along the lower third of FIGURE 3 to a point beyond both the right and the left ends of this figure. Likewise, it will be understood that the narrow fence strip 148 extends along the operator's edge of the table top from a point adjacent the left hand edge of the welding assembly 50. The inner or core-contacting side wall of fence 148 is parallel to the inner vertical side wall 149 of guide strip 142 but spaced therefrom a distance equal to the thickness of the corrugations in strip 61. Stated otherwise, it is pointed out that the inner vertical surface 149 of guide strip 142 projects to the right from the welding station shown in FIGURE 3 and forms an accurately positioned guide for the advancing lateral edge of core 14. The corresponding guide surface of fence 148 should be spaced sufficiently from surface 149 to make room for corrugated strip 61 after this strip has been welded to core 14 at the welding station. Any suitable means may be used to hold core 14 lightly pressed against the adjacent guide surfaces of guide strip 142 and fence 148. A particularly suitable expedient comprises jetting streams of compressed air against the opposite lateral edge of core 14.

*Operation*

The operation of the described automatic welding apparatus will be quite apparent from the foregoing detailed description of the principal sub-assemblies and their operative relationship to one another. To place the welder in operation, a roll 128 of flat ribbon as, for example, stainless steel, is mounted on supporting spindle 129 and the strip is fed between the pin wheel 130 and the back-up roll 132 and then between corrugating rolls 35, 35. Driving motor M is operated for a period to corrugate sufficent strip to form a loop of a size defined by the wide supporting rollers 15, the end of strip 61 being fed between guide members 142 and 144 and past the welding station (FIGURE 3). The ends of the first loop are overlapped in side by side relation with a crest of the free end pressed against an oppositely facing crest of the other or attached end advancing from corrugator rolls 35. Initially, several welds are formed between such abutting crests. Thereafter, the air jets are turned on to press the far side of the core loop against guide surface 149 and fence 148 as the welder functions automatically to weld together successive abutting crests of the advancing strip and core.

It will be unnecessary to repeat in detail the mode of operation of the indexing mechanism and of the welding assembly in view of the detailed description of these mechanisms set forth above. However, it is desired to point out that the initial starting position of the indexing mechanism and of the welding assembly is that represented diagrammatically in FIGURE 13, the electrodes then being fully retracted with the low portion of zone I of cam 56 underlying roller 58 of electrode carrier 53. In the corresponding position of the indexing mechanism 21, drive arm 48 is positioned horizontally in the nine o'clock position, and core 14 rests flat against the surface of table top 13 leaving a space of 5 to 10 mils between the upper face of the core and surface 76 of stationary clamping plate 78.

Figure 14:
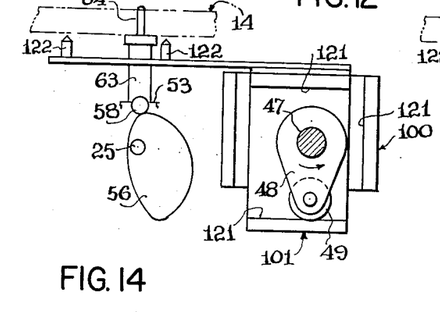
Figure 15:
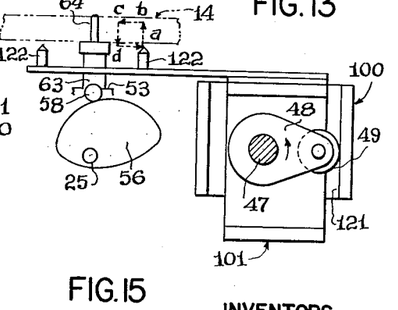

By the time indexing crank 48 has rotated through 90 degrees from the FIGURE 13 position to that shown in FIGURE 14, electrode driving cam 56 will have rotated 90 degrees to elevate electrode plunger 63 to its upper-most position wherein the lower and movable clamp plate 76 carried thereby is effective to lift the core and the adjacent portion of strip 61 out of contact with the table top and to clamp it firmly against surface 77 of upper plate 78. This action is most important and serves to remove or rectify any irregularity of the edges of strip 61 relative to the adjacent end surfaces or fabricated portions of core 14. As a result, the edges of the strip are forcibly and positively brought into co-planar alignment with the faces of core 14 and so held prior to the time roller electrode 87 moves into contact with the strip to apply welding pressure between the abutting crests undergoing welding.

Cam disc 38 rotating at the same speed as drive shaft 25 for the electrode and indexing mechanisms, is operative to close switch 40 to energize the automatic welding apparatus within cabinet 18 only during the period roller electrode 87 is in pressure contact with the parts being welded. In the manner described, the apparatus continues to recycle automatically to weld a new pair of crests together during each complete cycle or excursion of the welding roller and of the indexing mechanism. Indexing of the core occurs only during periods when the welding electrodes are retracted from and out of contact with the core. Moreover, during the excursion of the welding electrodes across the material, indexing pins 122 are being withdrawn rearwardly and extended into other core cells in readiness to advance the core immediately upon withdrawal of the electrodes. At the end of the forward indexing of the material and during retraction of indexing pins 122, holding pins 82 carried by electrode supporting plunger 63 are entering the lower ends of the pair of cells to either side of the cell being welded. Owing to this overlapping movement of indexing pins 122 and holding pins 82, there is always present within cells of the core material a portion of one or the other pair of the pins. Accordingly, there is no opportunity at any time for the core to get out of position. This highly desirable objective is further facilitated by the fact that both sets of pins are designed to fit the core cells with a close sliding fit allowing little or no play.

The welder is continued in operation until a core of desired width has been fabricated following which strip 61 is severed allowing the fabricated loop of core to be removed from the welder. The detached core may then be severed transversely and laid out in a straight line on a flat surface. So precisely accurate are all end surfaces of the cells in each face that the core is in immediate readiness for assembly into a sandwich structure formed by metal face plates or the like.

Figure 16:
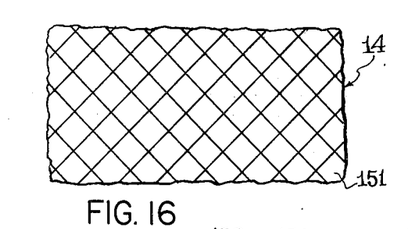
FIGURE 16 is a fragmentary view on an enlarged scale showing a section of the completed core material.
Figure 17:
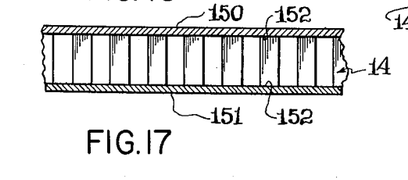
FIGURE 17 is a cross-sectional view through a completed sandwich formed from the core material.

A fragmentary section of the core product is shown in FIGURE 16, while FIGURE 17 shows this core welded between identical face plates of metal 150 and 151.

To fabricate the sandwich it is customary to pass the core through a degreasing operation to remove all traces of films, greases, lubricants and the like. Thereafter a thin film of brazing compound 152 may be applied to the facing surfaces of plates 150 and 151 as these plates are pressed against the opposite surfaces of core 14, and clamped in place. This clamped assembly is then placed within a brazing oven and known techniques followed in completing the brazing operation by heating the assembly under pressure until the film of brazing compound 152 fuses the cell ends of the core to sheets 150 and 151. Upon cooling, the pressure is removed and the assembly is withdrawn from the furnace ready for cutting to size and assembly in any of its many fields of use.

While the particular apparatus and method for producing honeycomb core material herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:
1. In combination, an automatic electric welder for fabricating cellular core material from foil-like metal stripping, said core having a multiplicity of similar cells each formed by a pair of transversely corrugated strips fused together at their abutting crests, said welder having a flat supporting surface, means for indexing core material undergoing welding past a welding station intermediate the opposite ends of said surface, first welding electrode means at said welding station movable crosswise of said core material and along the rear sides of abutting crests of said corrugated strip and of said core, means movable with said electrode means and operable to hold said core and said strip precisely in welding position under a limited predetermined load applied transversely of said core and strip including means for accurately aligning the edges of the strip with the adjacent edges of previously welded core before welding pressure is applied across the crests being welded and effective to maintain this accurate alignment while welding pressure and welding current is being applied, and second welding electrode means synchronized with said aligning and holding means movable in time-delayed sequence relative to the movement of said first electrode means for applying welding pressure and current to said abutting crests after the same have been aligned, said automatic welder being further characterized in that said first and second electrode means, said core indexing means and said core holding means are all located opposite the same face of core material.

2. The combination defined in claim 1 characterized in that said means for aligning the edges of said strip with the adjacent opposite faces of previously fabricated core comprises means having a pair of flat non-flexible faces disposed on the opposite sides of said core which faces are parallel to one another and to the faces of said core in an area thereof adjacent said welding station, means for holding said last mentioned means out of pressure contact with the core while the welding electrodes are being retracted from and re-inserted into said core, and means synchronized with the advance of said welding electrodes into welding position to press said flat faces into pressure contact with the faces of said core and with the adjacent edges of said strip to hold the latter accurately aligned with the core as said electrodes advance into welding position.

3. That improvement in the fabrication of welded cellular core material from transversely corrugated metal foil stripping of uniform width, said core being characterized by having the faces of the core accurately parallel to one another within a tolerance of approximately one mil or less without need for dressing the faces of the finished core after the welding fabrication thereof to bring said faces within this tolerance specification, which improvement comprises, a welding station, means for indexing at least a pair of corrugated strips past said welding station with the corrugations of one strip opening into the corrugations of the adjacent strip, means for pressing adjacent oppositely facing crests of said strips together for welding, means movable bodily toward and away from one lateral edge of said strips and actuatable only through spring means of predetermined strength forming part of said last-mentioned means for applying limited predetermined pressure resiliently against the opposite lateral edges of said strips in face areas thereof restricted to the cells directly attached to those then to be welded to bring said edges into precise co-planar relation along portions thereof astride said abutting crests as said crests are brought into contact without risk of deforming said core or strip by the pressure applied transversely thereof, and means for thereupon applying welding pressure and current across said abutting crests to weld the same together.

4. That improvement in the high precision fabrication of cellular core material from continuous transversely corrugated metal foil stripping of uniform width which improvement comprises, means for periodically inserting indexing pins into closely related cells of said core from one face thereof and for advancing the core to a welding station, means for retracting said indexing pins while simultaneously inserting core holding pins into other core cells from the same face of the core material, means movable bodily toward and away from one lateral edge of said core at said welding station and actuatable only through spring means of predetermined strength forming part of said last means for applying clamping action of predetermined value against the faces of said core in the area thereof restricted to the cells to be welded and those directly attached thereto in a manner to bring the edges of the strip to be welded to the core into precise co-planar relation with the respective core faces, and means for maintaining said clamping action at said predetermined value on said core faces and for simultanously applying welding pressure and current to abutting crests of said strip and core to weld the same together.

5. That improvement defined in claim 4 characterized in the provision of means for continuously repeating the defined indexing and welding operations cyclically and including means for retracting said indexing pins laterally away from said welding station while the welding operation is taking place, and means for reintroducing said indexing pins into new cells of the core while withdrawing said holding pins from entirely different ones of said cells than the cells occupied by said indexing pins whereby the two groups of pins mutually cooperate in holding the core in place during the alternate substitution of the two groups of pins for one another.

6. Welding apparatus for fabricating cellular core material from metal stripping to high tolerance specifications wherein the edges of the strips forming the opposed faces of the core are so precisely co-planar as to require no dressing following the welding assembly operation, said apparatus comprising a welding station, means for indexing core material past the welding station along with an attached strip of corrugated stripping to be welded to a lateral edge of the core, clutch plate means on the opposite faces of said core at said welding station, said clutch plate means including a pair of non-flexible members having flat accurately-parallel faces facing the opposite faces of said core and the edges of said corrugated strip, electrode means movable lengthwise of a pair of abutting crests of said strip and transversely of the thickness of said core, and operating means connected with said electrode means and with said clutch and including means operable to move said non-flexible plate means plates into firm engagement with the faces of said core and the adjacent edge portions of said strip to hold the same precisely co-planar and under a predetermined applied load force prior to and while said electrode means are being moved astride abutting crests to weld the same together and for thereafter releasing the clutching action of said plates on said core to permit the core to be indexed forwardly to bring additional abutting crests into welding position.

7. Welding apparatus as defined in claim 6 characterized in that said electrode means comprises an elongated rigid finger-like electrode having a narrow edge adapted to be seated along the bottom of a corrugation in a fabricated portion of the core and to remain stationary therewithin while welding current flows, a roller electrode having a narrow edge adapted to roll along the bottom of a corrugation in a strip being welded to said core and to press the abutting crests together under welding pressure, and means for shifting said roller lengthwise of said stationary finger electrode.

8. Welding apparatus for fabricating cellular cores from transversely corrugated metal strip, said apparatus comprising means providing a broad flat surface over which one edge of a closed loop of said stripping is adapted to be indexed as newly advanced corrugated strip is welded to the crests of a previous loop to form a loop of core of a desired width, synchronized welding electrodes and indexing means supported closely adjacent but rearwardly of the same side of said flat surface and constituting a welding station, said indexing means including a plurality of rigidly supported pins movable in a rectangular path lying in the path of core advance and in the plane of said pins, said pins being adapted to enter aligned cells of said core and to advance the core by a predetermined increment during each cycle of said indexing means, said electrode means including a straight rigid electrode and holding pins to either side thereof and supported for movement along with said rigid electrode, said holding pins being movable into a cell to either side of a pair of abutting crests of said stripping to be welded simultaneously with the entry of said rigid electrode into a cell having a crest to be welded, means for retracting said indexing pins rearwardly along one face of said core while advancing a second and cooperating welding electrode transversely of the core and along one of said abutting crests to weld said crests together while held in place by said holding pins, and means for driving said synchronized indexing and welding electrodes in a continuously repeating cycle.

9. Welding apparatus as defined in claim 8 characterized in that said synchronized electrodes and indexing pins are supported to the side of said flat core-supporting surface remote from said core thereby leaving said surface free and unobstructed for the movement and processing of said core in any desired width and length.

10. Welding apparatus for stitch-welding together thin transversely corrugated strips of material of cellular core material characterized by a multiplicity of similar small diameter cells opening through the opposite faces of the core, said apparatus including a table having an opening and a flat surface supporting corrugated strips edgewise while their abutting crests are stitch-welded together, means providing a welding station disposed below and intermediate the opposite ends of said table and adjacent said opening, said welding station means including synchronized core-indexing and welding electrode reciprocating mechanism confined to the underside of the table opposite stripping to be welded, and means including a common power-driven rotating shaft interconnecting said electrode and said indexing mechanism operable to index the strips accurately into welding position in alignment with the path of the electrodes and for thereafter advancing the electrodes astride a pair of abutting crests to weld the same together and simultaneously retracting said indexing means to a position for engaging said strips for the next indexing cycle.

11. Welding apparatus as defined in claim 10 characterized in that said electrode means includes an electrode carrier supported for to-and-fro movement, an electrode assembly mounted on said carrier including a narrow-edged finger-like electrode adapted to be advanced upwardly through said table opening and transversely of a pair of strips extending across said opening to provide continuous stationary support rearward of one crest to be welded, a second electrode adapted to be moved upwardly along the rear of a crest abutting said last mentioned crest while said finger electrode is supporting the same and to cooperate with the narrow edge of said finger electrode in stitch-welding said crests together, and a pair of holding pins supported closely parallel to said finger electrode and cooperable therewith in holding the strips in position for welding.

12. A reciprocating welding electrode assembly for use in welding thin transversely-corrugated metal stripping together to form cellular cores, said electrode assembly comprising a main support having a slideway therealong, an electrode carrier reciprocably mounted in said slideway, plunger means slidably supported lengthwise of said carrier and spring biased in one direction, a rigid finger-like electrode mounted on said plunger and adapted to be inserted crosswise of a corrugated strip with a straight narrow edge of the finger bearing against the bottom of a corrugation, a second electrode non-pivotally supported on said carrier and normally retracted below the base end of said finger electrode and resting against electrical insulation associated with said base end, and means for reciprocating said carrier along said slideway and operable to move said finger into welding position and to hold the same stationary in this position while moving said second electrode off said insulation and lengthwise of the narrow edge of said finger and cooperating therewith to apply welding current and welding pressure to abutting crests of corrugated strips located therebetween.

13. A welding electrode assembly as defined in claim 12 characterized in the provision of stop means opposite the limit of travel of said assembly and fixed to the main support for said assembly, said stop having a wide-area flat surface facing the electrode-supporting end of said plunger and lying at right angles to the axis of said plunger, said plunger having a wide area flat surface facing the flat surface of said stop means and accurately parallel thereto, said flat surfaces being cooperable to clutch the opposite edges of strips to be welded and to hold the same rigidly and resiliently clamped in parallel relation prior to and under a predetermined non-crushing load and during the movement of said second electrode crosswise of strips undergoing welding and gripped between said finger and roller electrodes.

14. The combination with apparatus for the cyclic welding together of thin uniform-width metal strips transversely thereof at intervals spaced lengthwise of said strips as the strips are indexed past a welding station, an electrode assembly movably supported at said welding station, and including a plurality of electrodes movable to and fro through a welding excursion transversely of and astride a pair of said strips said electrodes including a rigid finger electrode having an insulated base and a non-pivoting roller electrode, clamping means having a pair of rigid non-flexible parallel faces positioned respectively adjacent the opposite lateral edges of said strips and both of which faces are normally out of gripping engagement therewith, means for moving said clamping means resiliently against the opposite lateral edges of said strips under predetermined pressure to bring the adjacent edges thereof into co-planar relation, and means coordinated with the setting of said clamping plates in clamping position for advancing said non-pivoting roller welding electrode across said strips while the same remained clamped against relative edgewise movement and for thereafter withdrawing said roller onto the insulated base of finger electrode.

15. A welding electrode assembly adapted for use in fabricating honeycomb core structures from transversely corrugated strip metal, support means for said assembly and including bodily movable means having a wide area electrically non-conductive flat supporting surface for core material while being fabricated, an electrode carrier reciprocably mounted on said support means and including cooperating welding electrodes movable through a path generally normal to said supporting surface and along a pair of abutting crests of corrugated stripping to be welded together and supported on edge by said supporting surface, and means for reciprocating said pair of electrodes sequentially between a retracted position withdrawn to one side of said supporting surface with said electrodes separated from one another by said electrically non-conductive surface and an extended welding position traversing said supporting surface with said electrodes astride a pair of abutting crests to be welded and cooperating with one another to weld said abutting crests together.

16. A welding electrode assembly as defined in claim 15 characterized in that one of said pair of electrodes comprises a roller and the other an elongated narrow-edged finger-like electrode projecting at right angles from a flat-area base plate, said finger-like electrode being adapted to be moved crosswise of said stripping until the surface of said base plate projects beyond said supporting surface for said strip thereby to engage the edge of a pair of facing corrugated strips to be welded together and to support said edges accurately co-planar with one another, and means for thereafter passing said roller crosswise of said strips under pressure to weld said strips together at points between said pair of electrodes.

17. A welding electrode assembly as defined in claim 16 characterized in that said base plate includes a pair of pins extending therefrom parallel to and closely spaced from said finger-like electrode, said pins being positioned to enter cells of said core immediately adjacent the cell occupied by said finger-like electrode and being co-operable therewith to hold said core firmly in position while said roller electrode is making a welding excursion thereacross.

18. A welding electrode assembly as defined in claim 16 characterized in the provision of a notch in the edge of said base plate having its bottom close to the base of the narrow edge of said finger-like electrode, said roller being movable to-and-fro through said notch and crosswise of said stripping along a path directly opposite the narrow edge of said finger-like electrode.

19. The combination with welding apparatus for fabricating cellular core material from corrugated metal stripping as the core is indexed past a welding station of the type having cooperating electrodes reciprocable crosswise of the path of travel of the indexed material; of a welding and indexing mechanism disposed entirely opposite one face only of the core material undergoing fabrication and comprising a welding electrode assembly reciprocable lengthwise of a pair of abutting crests of transversely corrugated metal stripping to weld the same together and to then withdraw said electrodes clear of the core indexing path, holding pins carried by said electrode assembly positioned to enter fabricated cells of said core closely adjacent the welding station and cooperable with said electrodes to hold the core firmly in position during welding, indexing means for indexing said core past said welding station between welding excursions of said electrode assembly, a common drive shaft for said electrode assembly and for said indexing means, said indexing means including at least one pin movable through a rectangular path in one leg of which path said pin is seated snugly in a cell of said core while being moved in a path parallel to the axis of said pin to advance said core, said pin being carried by one of a pair of parallel plates each supported for reciprocation in paths at right angles to one another and in the plane of said plates, and said drive including a cam rotating within the peripheral confines of said plates and engageable sequentially with the flanged ends of each to move first one and then the other plate through one-half of its reciprocable path of movement.

20. The combination defined in claim 19 characterized in the provision of broad flat table means for supporting honeycomb core material while being indexed past said welding station, said welding station being located between the opposite ends of said table, and said welding electrodes, said indexing means and the power drive therefor being located on the underside of said table.

21. The combination defined in claim 20 characterized in the provision of means for supporting a closed loop of said honeycomb core material to either end and below said table.

22. The combination defined in claim 20 characterized in the provision of a spindle projecting vertically from said table top for supporting a supply roll of flat metal stripping, a pair of corrugating rolls mounted on said table beside said spindle formed to corrugate stripping and feed the same to said welding station, and drive means coupling said corrugating rolls to said common shaft drive for said electrode assembly and for said indexing means and serving to positively coordinate the operation of each.

23. Honeycomb core welding apparatus comprising a main frame having a flat-surfaced table and a plurality of core-supporting rollers cooperating with said table in supporting a large diameter loop of core material while being fabricated by indexing said core material past a welding station located between the opposite ends of said table and at an opening therethrough, a straight-edged stop along said table top closely beside one lateral edge of said loop of core material, fixed non-flexible stop plate means supported above said table at said welding station and having an immovable rigid flat under surface facing said table top opposite said opening, means below said table top adjacent and reciprocable through said opening for indexing said loop of core material past said opening and for intermittently projecting a pair of welding electrodes upwardly through said opening and transversely through said non-flexible core and toward said stop plate means, and resiliently supported means located below said table and operable by the upward movement of said electrodes to move said core and a corrugated strip being welded thereto upwardly under predetermined pressure against the underside of said non-flexible stop plate means before welding together the parts between the electrodes.

24. Electric welding apparatus for use in fabricating reticulated material from elongated corrugated metal elements as the same are indexed past a welding station, said apparatus including means for supporting elongated elements to be welded together, indexing meechanism for advancing said elements by a predetermined increment during each indexing cycle, said indexing mechanism including a pair of plates having flanges projecting from their opposite ends the facing surfaces of which flanges are adapted to be contacted by a rotating actuator for said plate, means supporting said plates from one another for reciprocating movement in parallel planes but in paths at right angles to one another, a rotary shaft having an axis passing generally centrally through large area cutouts in said plates and supporting an actuator thereon operable as said shaft rotates to engage the flanges of said plates sequentially to shift both plates simultaneously along first one and then the other of said paths of movement, and means supporting indexing pins aligned with openings between elements of said reticulated material and engageable therewith to index said material toward said welding station during the rotation of said shaft through one quadrant of a single revolution, and means at said welding station operable between periods of material indexing to clamp portions of adjacent elements together and pass a welding current therethrough.

25. An automatic welding apparatus for fabricating cellular core material from metal strip, said welder comprising a motor-driven shaft mounted on a supporting frame and below a table carried thereby for supporting core material undergoing fabrication, a welding electrode assembly movably mounted on said frame for reciprocable movement upwardly through an opening in said table and transversely across one end of said shaft, said electrode assembly having a pair of cooperating electrodes movable transversely of the path of advance of cellular core material undergoing fabrication, cam means operated by said shaft for reciprocating said electrodes through a complete welding cycle during each revolution of said shaft, core indexing means for advancing core material to be welded by a predetermined increment during each revolution of said shaft, and cam means mounted on said shaft for operating said core indexing means in timed relation to the reciprocation of said electrodes to advance said core only while said electrodes are retracted to one side of the path of advance of said core.

References Cited in the file of this patent
UNITED STATES PATENTS

| | | |
|---|---|---|
| 2,747,064 | Van Pappelendam | May 22, 1956 |
| 2,789,203 | Pigo et al. | Apr. 16, 1957 |
| 2,821,616 | Spott | Jan. 28, 1958 |
| 2,843,722 | Wegeforth | July 15, 1958 |
| 2,951,145 | Anspach | Aug. 30, 1960 |